United States Patent [19]

Holtgraver

[11] 4,148,458

[45] Apr. 10, 1979

[54] TIGHT SHUTOFF BUTTERFLY VALVE

[75] Inventor: Edward G. Holtgraver, Pittsburgh, Pa.

[73] Assignee: Fisher Controls Company, Marshalltown, Iowa

[21] Appl. No.: 805,671

[22] Filed: Jun. 13, 1977

[51] Int. Cl.² .............................................. F16K 1/226
[52] U.S. Cl. .................................... 251/148; 251/306; 137/375
[58] Field of Search ............... 251/148, 151, 152, 305, 251/306, 307, 308, 292, 315; 137/375; 285/55, 363, 368

[56] References Cited

U.S. PATENT DOCUMENTS

| | | | |
|---|---|---|---|
| 3,143,132 | 8/1964 | Pangburn | 137/375 |
| 3,346,005 | 10/1967 | Hanssen | 251/148 X |
| 3,503,415 | 3/1970 | De Angelis et al. | 251/151 X |
| 3,589,675 | 6/1971 | Scaramucci | 251/315 |
| 3,990,675 | 11/1976 | Bonafous | 251/148 |
| 4,014,511 | 3/1977 | Uno | 251/152 X |
| 4,079,746 | 3/1978 | Killian | 251/148 X |

Primary Examiner—William R. Cline
Attorney, Agent, or Firm—Lawrence L. Limpus

[57] ABSTRACT

A butterfly valve assembly to be installed between pipeline flanges and secured by flange bolts is disclosed. A cylindrical valve body ring, having a cylindrical bore and a face portion at each end, has a resilient elastomer lining which covers the bore and extends over a portion of the faces. A disk is attached to a shaft which extends through the body ring and liner transverse to the axis of the body ring. The valve assembly has at least one face plate with an opening which circumscribes the portion of the liner extending over the face of the body ring.

2 Claims, 3 Drawing Figures

TIGHT SHUTOFF BUTTERFLY VALVE

BACKGROUND OF THE INVENTION

This invention relates generally to butterfly valves. In another aspect, the invention relates to such valves having resilient liners for tight shut-off and being adapted for use with a manual or automatic actuator.

In butterfly valves designed for tight shutoff, it has been common to employ a cast-metal valve body which is provided with a resilient liner of some suitable material such as an elastomer, halocarbon polymers, and the like. Typically, the body castings of these prior art valves have been provided with a boss on the body to which is attached an automatic or manual valve actuator.

Such cast-body valves are expensive and cumbersome to manufacture, because the casting must ordinarily be inspected visually or by X-ray methods for flaws, the flaws welded, and the body machined on various surfaces with the attendant generation of substantial amounts of scrap metal shavings.

SUMMARY OF THE INVENTION

It is an object of this invention to provide a simple, lightweight and economical butterfly valve structure.

Another object is to provide an actuator mounting structure for butterfly valves which may be made separately from the valve body proper.

Yet another object is to provide a low cost butterfly valve having a resilient lining.

A further object is to provide a structure for containment of pressure within a valve body in which a resilient body liner is employed.

Still another object is to provide a valve body made from a simple ring, such as a section of pipe or tubing, which is inexpensive and readily available.

To achieve these, as well as other objects which will become apparent herein, a cylindrical valve body ring adapted to receive a rotary valve shaft transverse to the axis of the body ring is provided. On the shaft, within the valve body ring, is retained a valve disk, or closure member. One end of the shaft extends through the body ring wall to the exterior thereof and this end of the shaft is adapted to engage a rotary valve actuator.

The valve body ring is provided with a resilient liner which covers the cylindrical bore of the body ring and includes two annular flange-like face portions which extend outwardly from the body ring bore and cover a portion of each of the end faces of the body ring. The inside diameter of the body liner is such as to sealingly engage the periphery of the valve disk when the disk is rotated to a position transverse to the axis of the body ring.

Two face plates are provided, one on each side of the valve body ring, each plate having an annular ringlike portion and first and second tab portions. The annular ringlike portion of each face plate has an inner diameter slightly larger than the outer diameter of the face portions of the valve liner, and each plate is desirably thinner in the direction of the valve body ring axis than the face portions of the liner. The tab portions of these plates extend radially outwardly from the body ring and the first tab portion provides means for mounting an actuator, manual or automatic, to the assembled valve.

A valve according to this invention is assembled into a pipeline by mounting between two conventional pipe flanges, the flange bolts fitting around the outside of the valve body ring and the face plate tabs extending between two of the bolts. When the flange bolts are tightened, each of the liner face portions is compressed between a side of the body ring and a pipe flange to effect a seal therebetween. The compression of the liner face portions is limited by abutment of the pipe flange against the annular portion of the face plate, to prevent damage to the liner face portion. The tightened flange bolts rigidly clamp the face plates between the pipe flanges and the valve body ring. An actuator mounted on the first tab portions of the face plates is maintained in a fixed position relative to the valve shaft by the immobile face plates.

BRIEF DESCRIPTION OF THE DRAWINGS

Attention is now directed to the drawings, in which.

DESCRIPTION OF PREFERRED EMBODIMENTS

Figure 1:
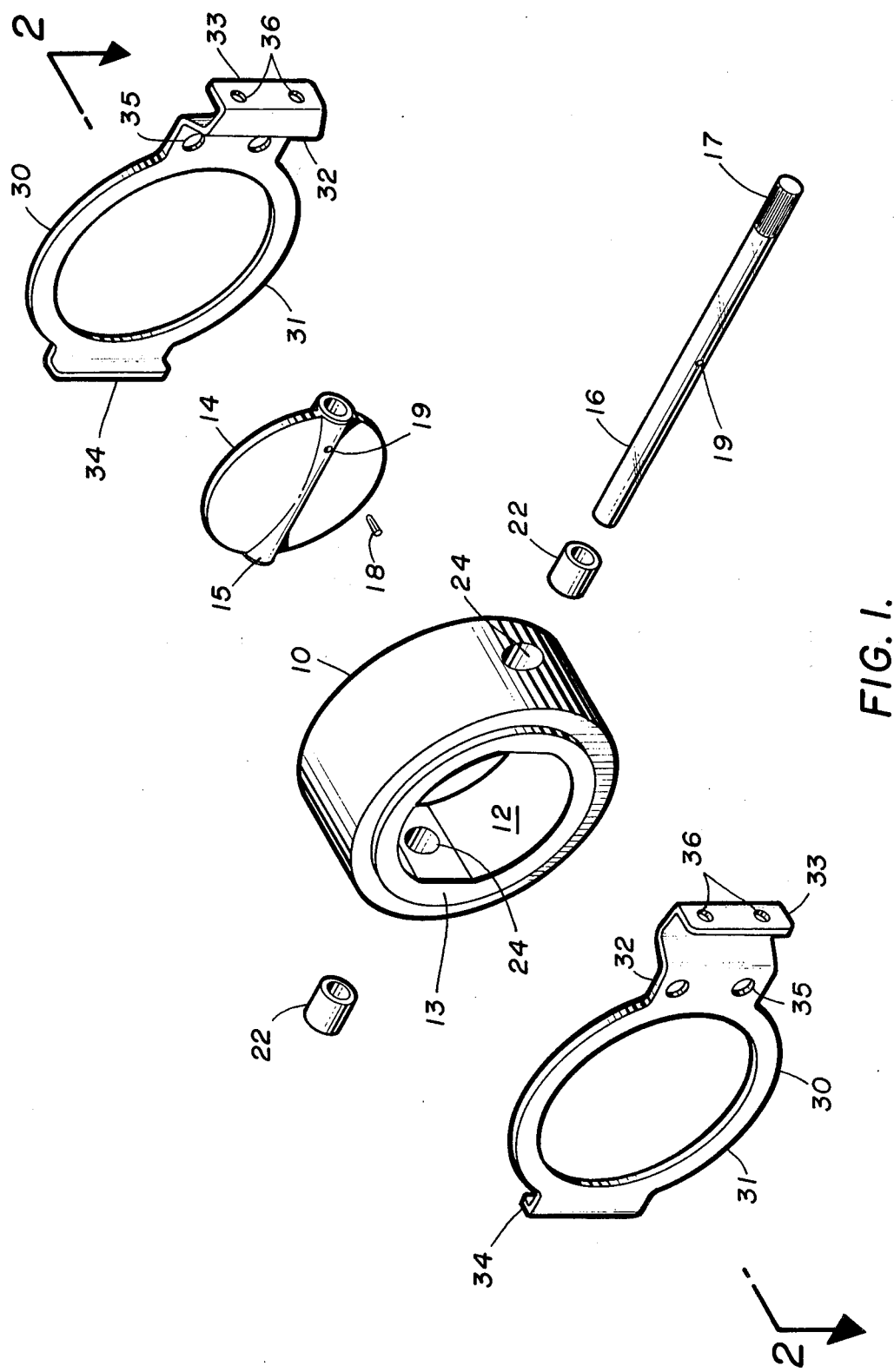
FIG. 1 is an exploded view of a butterfly valve according to this invention.

Referring now to FIG. 1 an exploded view of the butterfly valve of this invention is shown. A cylindrical valve body ring 10, made of a rigid material, has a resilient liner 12, a layer of elastomer, vulcanized or bonded to the body ring 10 such that the liner 12 covers the cylindrical bore of the body ring 10 and extends outwardly from the body ring bore to cover a portion of each of the end faces of the body ring 10 to form two annular flange-like liner face portions 13. The valve body ring 10 is adapted to receive a rotary valve shaft 16 transverse to the axis of the body ring 10. On the valve shaft 16, within the valve body ring 10, is retained a closure member or valve disk 14, which may be made from a metallic material, such as stainless steel or bronze, or a nonmetallic material such as fiberglass reinforced plastic, to be chemically and physically resistant to the fluid which is to flow through the valve. The valve disk 14 has an enlarged portion 15 through which the valve shaft 16 extends. The valve disk 14 is fixedly retained on the valve shaft 16 by taper pin 18 which is inserted into aligned tapered holes 19 in the valve shaft 16 and the enlarged portion 15 of valve disk 14. The two ends of the valve shaft 16 extend through two holes 24, formed diametrically opposite each other through the liner 12 and body ring 10, to the exterior of the valve body ring 10. One end of the valve shaft 16 is adapted to engage a rotary valve actuator, for example, by splines 17 shown on valve shaft 16 or by a groove and key (not shown). Within the holes 24 the valve shaft 16 is supported by bearing bushings 22 which may be formed of a low friction fluorocarbon resin, such as Teflon (Teflon is a registered trademark of E. I. Du Pont de Nemours and Company for their fluorocarbon resin). In conventional tight-shutoff rubber lined valves it is common for the rubber sealing member to be fitted into the valve body. The valve body confines the internal line pressure while the rubber sealing member provides for tight shutoff. Similarly, it has been common to require packing within each aperture in the valve body to prevent leakage of fluid from the interior of the valve to the exterior. In the valve of this invention, the liner 12 is designed to resist line pressure with the body ring 10 acting as a back-up ring to provide structural rigidity. Additionally, the internal diameter of the cylindrical liner 12 of the valve of this invention is sized for an interference fit with the valve disk 14 whereby the resilient elastomer liner 12 sealingly engages the periphery of the valve disk 14 when the disk is rotated to a position transverse to the axis of the body ring 10. An interference fit is also formed between the elastomer liner 12 and the valve shaft 16 which forms a seal to prevent fluid leakage through the holes 24. No separate sealing member has been shown; however, a seal, for example, an o-ring, may be used within holes 24 to prevent fluid leakage through the holes 24. The relative physical positions of these valve pieces may be more easily understood by examination of FIG. 2 which shows a cross-sectional view of the butterfly valve of this invention taken along the sectional line 2-2 in FIG. 1.

Figure 2:
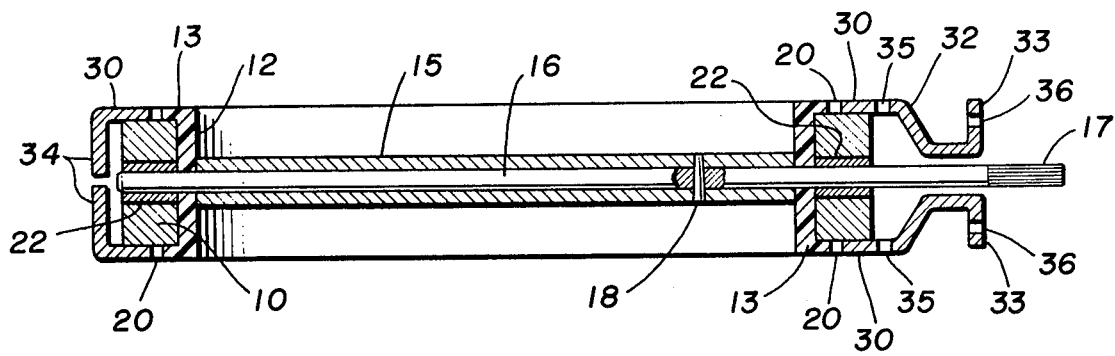
FIG. 2 is a sectional view of the valve of FIG. 1, taken at line 2—2.

Referring to FIG. 1 again, a pair of face plates 30 are provided. Each face plate 30 is formed from a thin metal sheet, for example by stamping, which is bent to provide the desired face place configuration. Each face plate 30 has an annular ring-like portion 31, with an inner diameter slightly larger than the outer diameter of the face portion 13 of valve liner 12, and first and second tab portions 32 and 34. The first tab portions 32 of the face plates 30 extend radially outwardly from the ring-like portion 31 of the face plates 30 and provide a means for mounting an actuator to the assembled valve. An example of an actuator mounting means is shown in FIGS. 1 and 2 wherein the first tab portions 32 of each of the face plates 30 are extended radially outwardly, and parallel one another, from the ring-like portion 31 a short distance where they then are sloped toward one another before bending to form parallel facing planer portions terminating in ears 33 which extend away from one another at about a right angle from the planer area. An actuator may be attached to the ears 33 by use of bolt holes 36. Many other configurations would serve equally well. A second tab portion 34 extends from the ring-like portion 31 of the face plate 30 diametrically opposite the first tab portion 32. The second tab portion 34 of each of the face plates 30 extend radially from the ring-like portions 31 of the face plates 30 and are then bent at about a right angle toward one another to extend, externally of the valve body ring 10, parallel the axis of the valve body ring 10. The two second tab portions 34 approach each other at the exterior of the valve body ring 10 to retain the second end of the valve shaft 16 for reasons of safety. Should the valve shaft 16 fracture in service, the actuator retains one end of the valve shaft 16 within the valve body ring 10 while the second tab portions 34 prevent outwardly longitudinal movement of the second end of valve shaft 16.

As shown in FIG. 2, each face plate 30 is thinner in the direction of the valve body ring 10 axis than the face portions 13 of the valve liner 12. Also, as noted above, the inner diameter of the ring-like portion 31 of face plate 30 is slightly larger than the outer diameter of the face portion 13 of valve liner 12. When the valve is assembled, as shown in FIG. 2, a gap 20 is left between the ring-like portion 31 of face plate 30 and the face portion 13 of valve liner 12.

Figure 3:
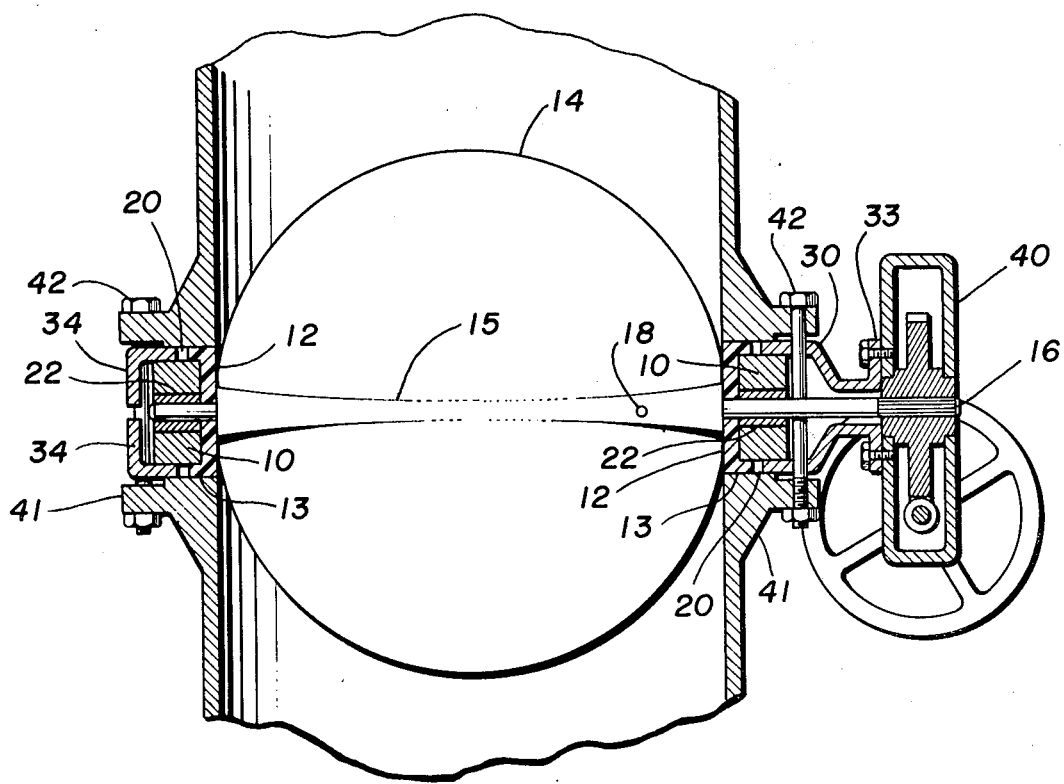
FIG. 3 is a sectional view of the valve of FIG. 2 showing the valve installed between conventional pipe flanges with an actuator mounted on the face plates.

Referring now to FIG. 3, the butterfly valve of FIGS. 1 and 2 is shown in a sectional view, mounted between conventional pipe flanges 41 which are held together by flange bolts 42. Additionally, an actuator 40 is shown bolted to the ears 33 which extend from the first tab portions 32 of face plates 30. Here a manual actuator 40 is shown; however, any rotary valve actuator, manual or automatic, may be used with this valve. The outer diameter of the ring-like portion 31 of face plates 30 is sized so that flange bolts 42 will fit around the outside of face plate 30 with only a small clearance; thus, the flange bolts 42 center the butterfly valve between the pipe flanges 41. The second tab portion 34 of the face plates 30 is sized such that, when the assembled valve is installed in a pipeline by mounting the valve between conventional pipe flanges 41, the second tab portion 34 extends between two of the flange bolts 42. The first tab portions 32 of face plates 30 include cutout portions or holes 35 through which the pipeline flange bolts 42 extend to aid in centering of the valve between the line flanges 41.

When the assembled valve is installed in a pipeline between two conventional pipe flanges 41, as shown in FIG. 3, tightening of the flange bolts 42 forces the pipe flanges 41 against the protruding elastomer of the liner face portions 13 and the elastomer is axially compressed to form a flange seal until further compression is prevented by abutment of the pipe flanges 41 against the face plates 30. The liner face portions 13 separate the face plates 30 from the fluid which will pass through the pipeline and the valve body ring 10, thus the face plates 30 may be made of a thin metal which need not be either chemically or physcially resistant to the fluid. Tightening of the flange bolts 42 also rigidly clamps the face plates 30 between the pipe flanges 41 and the faces of the valve body ring 10, resulting in the face plates 30 being immobile relative to the valve body ring 10 and thereby providing a stationary support for an actuator 40.

Thus, there has been provided by the present invention a simple inexpensive lined butterfly valve in which the actuator mounting structure is made separately from the valve body. The face plates which support the actuator are made separately from the valve body, thus the valve body ring may be cut from a section of pipe or tubing which are inexpensive and readily available rather than requiring a heavier, more expensive casting. A resilient lining is provided within the valve body ring for tight shut-off.

Having thus shown and described presently-preferred embodiments of the present invention, it will be apparent to those skilled in the art that many modifications and variations are possible in the light of the above teachings. It is therefore to be understood that my invention may be practiced other than as herein specifically described.

What is claimed is:

1. A butterfly valve assembly to be installed between pipeline flanges and secured by flange bolts, comprising a cylindrical body ring, formed from a section of pipe or tubing, having a cylindrical bore and a face portion at each end of said body ring; a corrosion resistant, resilient liner covering said cylindrical bore and integrally projecting radially outwardly along said face portions completely around said bore for a limited distance; a shaft extending through said body ring and liner transverse to the axis of said body ring; a disk attached to said shaft within said body ring and liner; and at least one face plate, formed from a metal thinner in the axial direction than the portion of said liner projecting over said face portions of said body ring, said face plate having an opening which circumscribes the portion of said liner extending over the faces of said body ring and said at least one face plate has a tab which extends raially outwardly from said body ring, said tab providing means for mounting an actuator on said assembled butterfly valve body; whereby, when said butterfly valve assembly is installed between said pipeline flanges, the portion of said liner projecting over said face portions of said body ring is compressed between said face portions of said body ring and said pipeline flanges to form a flange seal and said at least one face plate is isolated from said bore of said body ring.

2. The butterfly valve assembly of claim 1 wherein said tab on said at least one face plate includes cutout portions for pipeline flange bolts whereby said valve may be centered between said flanges.

* * * * *